US008849963B2

(12) United States Patent
Camarillo Gonzalez et al.

(10) Patent No.: US 8,849,963 B2
(45) Date of Patent: Sep. 30, 2014

(54) METHOD AND APPARATUS FOR CONNECTING LEGACY NODES

(75) Inventors: Gonzalo Camarillo Gonzalez, Helsinki (FI); Sébastien Pierrel, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 501 days.

(21) Appl. No.: 12/865,603

(22) PCT Filed: Jan. 30, 2008

(86) PCT No.: PCT/EP2008/051113
§ 371 (c)(1),
(2), (4) Date: Jul. 30, 2010

(87) PCT Pub. No.: WO2009/095074
PCT Pub. Date: Aug. 6, 2009

(65) Prior Publication Data
US 2010/0325248 A1 Dec. 23, 2010

(51) Int. Cl.
*G06F 15/177* (2006.01)
*H04L 29/08* (2006.01)
(52) U.S. Cl.
CPC .............. *H04L 67/16* (2013.01); *H04L 67/24* (2013.01)

USPC .......... 709/220; 709/203; 709/217; 709/218; 709/219; 709/223; 709/231; 709/232
(58) Field of Classification Search
USPC ......................................................... 709/220
See application file for complete search history.

(56) References Cited

U.S. PATENT DOCUMENTS

| 2002/0174178 | A1* | 11/2002 | Stawikowski | 709/203 |
| 2006/0106968 | A1* | 5/2006 | Wooi Teoh | 710/316 |
| 2006/0133392 | A1 | 6/2006 | Ajitomi et al. | |
| 2008/0311888 | A1* | 12/2008 | Ku et al. | 455/414.1 |

\* cited by examiner

*Primary Examiner* — Phuoc Nguyen
*Assistant Examiner* — Clarence John (57) ABSTRACT

A method of enabling a legacy host, attached to a local network, to discover a service provided by a remote server. The method comprises the following steps to be performed by an IP Multimedia Subsystem Gateway within said local network. (1) Subscribing to an IP Multimedia Subsystem presence service and receiving presence information published by the presence service including Globally Routable User agent URIs. (2) Receiving a service discovery message sent by said legacy host. (3) Searching said presence information to identify a requested service and an associated Globally Routable User agent URI. (4) Sending a response to said legacy host including a local network address of the Gateway, whilst maintaining a mapping between said local network address and said Globally Routable User agent URI.

15 Claims, 6 Drawing Sheets

METHOD AND APPARATUS FOR CONNECTING LEGACY NODES

TECHNICAL FIELD

The present invention relates to a method and apparatus for connecting legacy nodes and in particular, though not necessarily, to a method and apparatus for connecting legacy clients and/or servers attached to different local networks or to the public Internet.

BACKGROUND

Multi-user Internet applications such as games are typically implemented using a client-server paradigm. If a particular client does not know the location of a required server it must discover that location before any interaction can occur (e.g. participate in a game session hosted by the server). A client will typically use a discovery protocol in order to discover servers in the network. A new client that is started somewhere in the network generally uses the discovery protocol to broadcast a discovery message. Servers in the network receive the discovery message and respond to it informing the client about their presence in the network and the services that they offer. A server's response to a discovery message has enough information so that the client can contact the server at a later point (e.g. an IP address and port number). In some cases, a directory server may be provided which acts as a focal point for service information, broadcasting discovery messages across the local network in order to collect service information from network servers (including respective IP addresses and port numbers), and responding to discovery requests from clients. An example service discovery protocol is specific to the well known game QUAKE™ is the "Quake Network Protocol".

Discovery protocols relying upon broadcast discovery messages can, typically, only be used within local networks. These protocols do not scale to the public Internet or to large networks with different sites (e.g., a corporate or a university network) where the broadcasting of such signalling messages would result in an intolerable burden on the available bandwidth. This means that users are restricted to their local networks unless of course they have prior knowledge of the location of a remote server (e.g. due to the location being advertised on a web site or obtained from a "rendezvous" server). Even in this case however, problems can arise due to the presence within local networks of Network Address Translators (NATs) and firewalls.

Some discovery protocols do support discovery in remote networks. However, these require special support in network routers, i.e. the routers must understand the discovery protocol used by the application, e.g. game.

SUMMARY

It is an object of the present invention to provide a mechanism whereby a legacy host can discover a service using a legacy service discovery protocol, despite the service being provided outside of the host's local network. Similarly, it is an object to allow a legacy server to publish details of the services that it offers, to hosts outside of the server's local network. These and other objects are achieved by utilising the IP Multimedia System, and more particularly a presence service of an IP Multimedia System, to publish service details including Globally Routable User agent URIs.

According to a first aspect of the present invention there is provided a method of enabling a legacy host, attached to a local network, to discover a service provided by a remote server. The method comprises the following steps to be performed by an IP Multimedia Subsystem Gateway within said local network: subscribing to an IP Multimedia Subsystem presence service and receiving presence information published by the presence service including Globally Routable User agent URIs; receiving a service discovery message sent by said legacy host; searching said presence information to identify a requested service and an associated Globally Routable User agent URI; and sending a response to said legacy host including a local network address of the Gateway, whilst maintaining a mapping between said local network address and said Globally Routable User agent URI.

Embodiments of the invention allow a host to continue to use a legacy service discovery protocol on a local network, to discover remotely available services. As far as the host is concerned, discovered services appear as if they are on the local network.

The IMS Gateway registers to the IMS using a public user identity (IMPU) of the legacy host. It subscribes to the presence service using the IMPU.

Preferably, said step of searching said presence information identifies a plurality of services matching said request, the method comprising sending a plurality of responses identifying respective local network addresses, and maintaining at the gateway a mapping between said local network addresses and respective Globally Routable User agent URIs. More preferably, said presence information includes, for each Globally Routable User agent URI, a service description, and said step of searching said presence information comprises searching the service descriptions for a service matching said request.

According to a second aspect of the present invention there is provided a method of connecting a legacy host to a service provided by a remote server. The method comprises: discovering said service using the method of the above first aspect of the present invention; receiving a connection request at said local network address of said Gateway; mapping said local network address to a Globally Routable User agent URI; sending a SIP INVITE to said Globally Routable User agent URI; and establishing an IMS session.

According to a third aspect of the present invention there is provided a method of enabling a legacy server, attached to a local network, to advertise its service(s) to remote clients. The method comprises the following steps to be performed by an IP Multimedia Subsystem Gateway within said local network: subscribing to an IP Multimedia Subsystem presence service; broadcasting, over said local network, a service discovery message; receiving a service response from said legacy server including a local network address for each service offered; assigning a Globally Routable User agent URI to the or each service and maintaining a mapping between the Globally Routable User agent URI(s) and the local network address(es); and publishing the Globally Routable User agent URI(s) on said IP Multimedia Subsystem presence service.

Typically, the operator of said legacy server is a subscriber of an IP Multimedia Subsystem providing said presence service, with the Gateway performing an IP Multimedia Subsystem registration on behalf of the operator.

According to a fourth aspect of the present invention there is provided a method of connecting a legacy host to a service provided by a remote server. The method comprises advertising said service using the method according to the above third aspect of the present invention, receiving a SIP INVITE at said Gateway and addressed to the or one of said Globally Routable User agent URIs, mapping the Globally Routable User agent URI to a local network address of said server, and sending a connection establishment request to said server.

According to a fifth aspect of the present invention there is provided apparatus configured to operate as an IP Multimedia Subsystem Gateway within a local network for the purpose of enabling a legacy host, attached to said local network, to discover a service provided by a remote server, the apparatus being configured to subscribe to an IP Multimedia Subsystem presence service and to receive presence information published by the presence service including Globally Routable User agent URIs, to receive a service discovery message sent by said legacy host, to search said presence information to identify a requested service and an associated Globally Routable User agent URI, and to send a response to said legacy host including a local network address of the Gateway, whilst maintaining a mapping between said local network address and said Globally Routable User agent URI.

According to a sixth aspect of the present invention there is provided apparatus configured to operate as an IP Multimedia Subsystem Gateway within a local network for the purpose of advertising services available on one or more servers attached to the local network, the apparatus being configured to subscribe to an IP Multimedia Subsystem presence service, to broadcast, over said local network, a service discovery message, to receive a service response from said legacy server including a local network address for each service offered, to assign a Globally Routable User agent URI to the or each service and maintain a mapping between the Globally Routable User agent URI(s) and the local network address (es), and to publish the Globally Routable User agent URI(s) on said IP Multimedia Subsystem presence service.

The term "legacy" is used here to denote a node, host, server, etc, that utilises a conventional, e.g. broadcast based, service discovery protocol to identify and/or publish available services.

DETAILED DESCRIPTION

The IP Multimedia Subsystem (IMS) is a technology defined by the Third Generation Partnership Project (3GPP) and ETSI TISPAN group to provide IP Multimedia services over mobile communication networks (3GPP TS 22.228, TS 23.228, TS 24.229, TS 29.228, TS 29.229, TS 29.328 and TS 29.329 Releases 5 to 7, and TS24.173 Release 7). IMS provides key features to enrich the end-subscriber person-to-person communication experience through the use of standardised IMS Service Enablers, which facilitate new rich person-to-person (client-to-client) communication services as well as person-to-content (client-to-server) services over IP-based networks. IMS makes use of the Session Initiation Protocol (SIP) to set up and control calls or sessions between subscriber terminals (or subscriber terminals and application servers). The Session Description Protocol (SDP), carried by SIP signalling, is used to describe and negotiate the media components of the session. Whilst SIP was created as a subscriber-to-subscriber protocol, IMS allows operators and service providers to control subscriber access to services and to charge subscribers accordingly.

In the case of legacy terminals within a local network, access to IMS services may be facilitated by introducing into the local network an IMS Gateway functionality. Such a Gateway will provide interworking between legacy protocols (used within the local network) and the IMS protocols. The Gateway can be used to connect a legacy terminal, either a client or a server, to a peer node either directly or via a further IMS Gateway via the IMS network, with a guaranteed reliability and Quality of Service (QoS). Typically, a user will possess an IMS subscription, e.g. as a result of subscribing to a "triple-play" service of a network operator. When the user wishes to access IMS service via a (broadband) network terminal, e.g. a PC, the IMS Gateway will register the user's IMS public user identity (IMPU) with the IMS network, on behalf of the user. The Gateway will register its own address (SIP URI) as a contact address for the user.

An IMS core network comprises Call/Session Control Functions (CSCFs) that operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber that the subscriber is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a subscriber's Subscriber Profile. ASs may also be coupled to user terminals via non-3G interfaces, e.g. to allow users to access IMS services via a web (http) interface. In this case, the user terminal may contain an IMS/SIP client, or some other application in which case the AS is required to perform some translation (proxy) function on behalf of the user terminal.

Whilst the IMS appears to provide a suitable mechanism for connecting a legacy terminal to a peer node at a remote location, it remains necessary to provide an efficient method for determining and advertising the locations of servers offering services to clients, which locations are not known a priori.

IMS can be used to discover servers running in different remote networks and to establish connections to them. Servers are discovered through the IMS presence service which is provisioned by a dedicated presence Application Server. The presence service is specified in 3GPP TS 24.141 and is intended to provide a mechanism whereby users can determine the availability and possibly the location of other users. Once registered with the IMS, users or their proxies publish their presence information on a home presence AS. This information can include a status, e.g. available/unavailable, and one or more contact addresses. Users subscribe to the presence information of other users using IMPUs. Presence ASs interact with one another to disseminate presence information.

It is proposed here to introduce new functionality into the IMS Gateway to enable the Gateway to make use of the IMS presence service to facilitate the connection of legacy clients and servers. More particularly, this new functionality causes the IMS Gateway to listen to discovery messages (e.g. Quake Network Protocol discovery messages) broadcast from clients within the local network. The IMS gateway searches for servers using the IMS presence service and returns this information to the client from which the discovery message originated. Furthermore, when a client in the local network attempts to establish a connection with a remote server which was discovered through the IMS Gateway, the IMS Gateway receives the legacy connection establishment message from the client and establishes a connection towards the remote server using the IMS. The new functionality also allows legacy servers within a local network to advertise their locations via the IMS presence service. When the IMS Gateway receives a connection establishment request from the IMS for a server in the local network, the IMS Gateway accepts the connection on the IMS side and establishes a connection, using a legacy protocol, with the server in the local network. The use of IMS is transparent to the legacy clients and servers which still use the broadcast-based discovery protocols.

Figure 1:
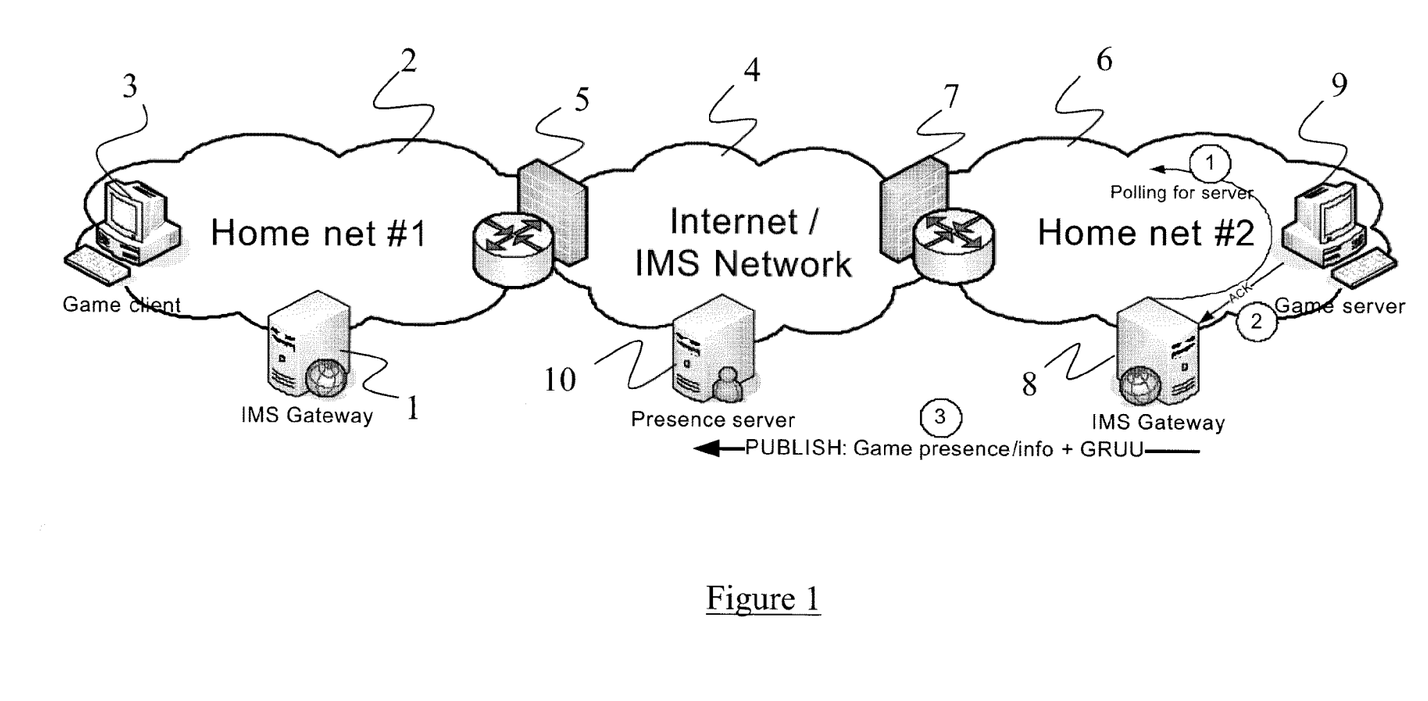
FIGS. 1 to 3 illustrate schematically sets of communication networks facilitating the connection of a client to a server, and signalling associated with establishing this connection.

FIG. 1 illustrates schematically a first IMS Gateway 1 located within a first local network 2 to which a client 3 is attached. This first network could be a LAN, WLAN, WiMAX network or the like. The first network 2 is coupled to the Internet or other IP network 4 (such as the IP backbone of a Telco) via a router and firewall 5. Within the IP network 4 or connected to that network is an IMS core network as described above. The IP network 4 is shown connected to a second local network 6, again via a router and firewall 7. Within this second network, a second IMS Gateway 8 is present, as well as a server 9. For the purpose of illustration, one can assume that the server 9 is a game server which interacts with multiple game clients, one of which is the client 3 within the first local network 2.

When an IMS Gateway is initialised, the Gateway is configured to register to the IMS using the IMPU(s) of the user(s), client or server, present in the local network. Once registered it is configured for each user to subscribe to the presence information of a few peer users (e.g. the "friends" of the owner of the IMS gateway), via the IMS presence Application Server 10.

Both IMS Gateways broadcast discovery messages in their respective local networks, e.g. according to the Quake Network Protocol. When a server becomes active in the local network, it responds to a discovery message by advertising its service(s). When an IMS Gateway receives a response to one of its discovery message from a server, the IMS Gateway updates the server's IMS presence information for the server (corresponding IMPU) using a SIP (Session Initiation Protocol) PUBLISH request. In this PUBLISH request, the IMS Gateway includes a GRUU (Globally Routable User agent URI) that remote clients can use to contact the server in the context of the application (e.g., the game). The GRUU is allocated by the IMS Gateway and is a SIP URI that can be used to route messages across the IMS to the Gateway. The IMS Gateway also includes in the PUBLISH request a description, name, or reference that describes the application (e.g., use this URI to play "Game name" with me). The IMS Gateway can be configured with this information beforehand or to ask for input every time it receives a new response to a discovery message.

In the example illustrated in FIG. 1, server 9 will respond to the broadcast of a discovery message by the second IMS Gateway 8. The response will include the local IP address and port number at which the server will receive client requests in respect of a particular application (to initiate a game session). The second IMS Gateway will map this IP address and port number to the GRUU and to the IMPU associated with the server, and will publish the GRUU for the IMPU in the IMS presence service.

On receiving a response to a discovery message, the IMS Gateway can be configured to always update the presence information of a particular server, or to first ask for further input from the server in order to decide which user's presence information needs to be updated, in case the IMS Gateway serves multiple users.

Figure 2:
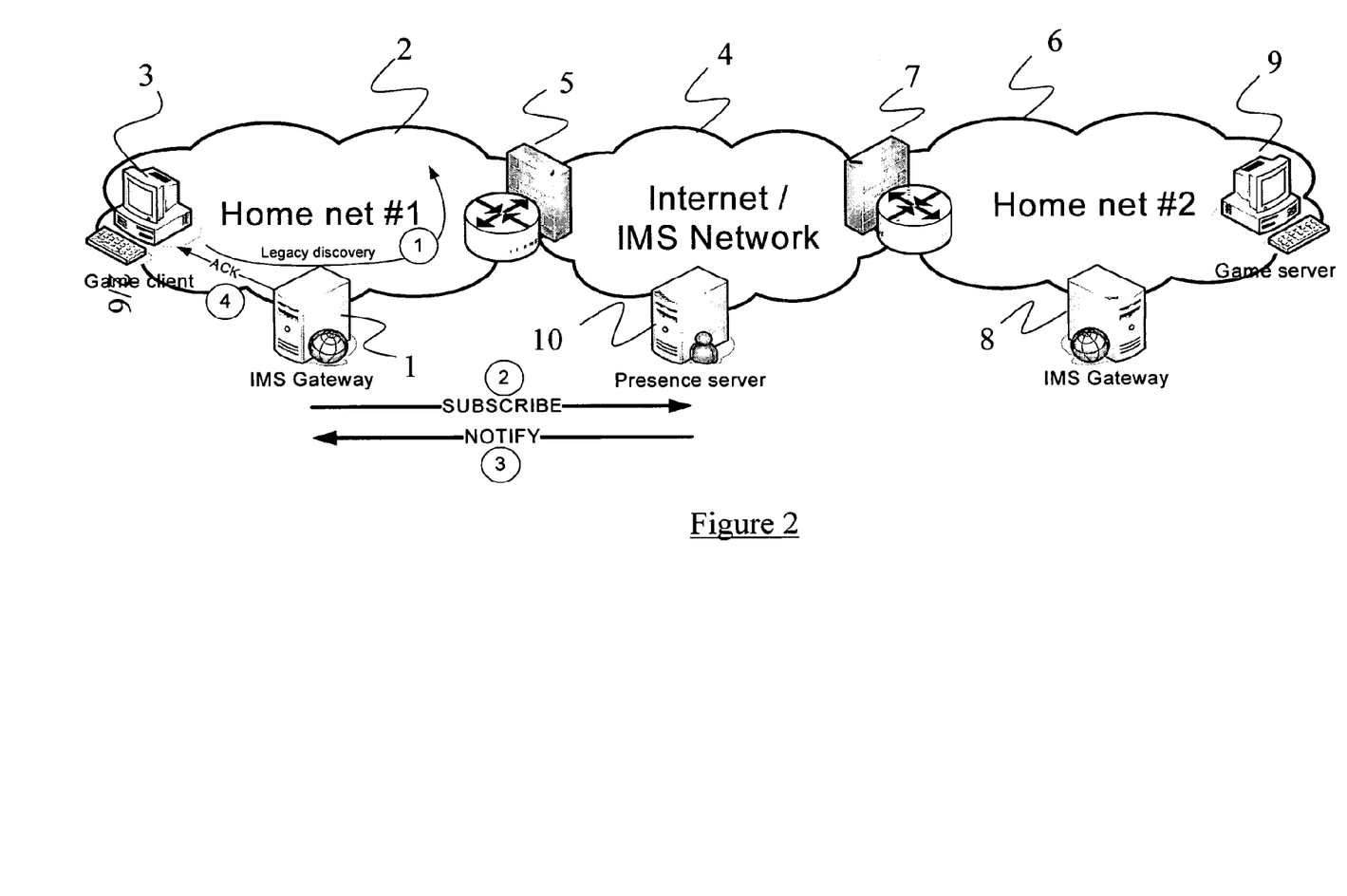

Considering now the client side, the first IMS Gateway is configured to subscribe, using the IMS SUBSCRIBE method, to the presence information of a set of users (i.e. a set of IMPUs). This information is periodically sent from the IMS presence AS to the IMS Gateway in SIP NOTIFY messages as illustrated in FIG. 2. As the first IMS Gateway performs an IMS registration for each IMPU present on the local network, it will make separate subscriptions to the presence service for each of these local IMPUs. Indeed, subscribing to the presence information published for a peer user (in a remote network) may only be possible when acting on behalf of one of the local IMPUs, i.e. a peer use may only permit its presence information to be provided to certain specified IMPUs.

It is assumed that the IMPU for the local client 3 has been registered in the IMS by the first IMS Gateway 1. When the local client broadcasts a discovery message in the local network, requesting a particular service, the IMS Gateway will search for appropriate servers in the presence information that it has obtained. The IMS Gateway may perform this search by checking if the description of a GRUU contains the name of the application (e.g. game) requested by the client in the service discovery message. If the IMS Gateway finds such a server, it will respond to the discovery message by identifying a server location to the client. However, this location is not the GRUU of the remote server, but rather an IP address and port number within the local network and which belongs to the first IMS Gateway. The address and port number are allocated from a pool of addresses belonging to the IMS Gateway, and are mapped to the GRUU.

If the IMS Gateway finds more than one server in the previously retrieved presence information, it may need to use different ports or even IP addresses to send several responses (one per server that was found) to the client, so that the client understands that each response represents a different server.

Figure 3:
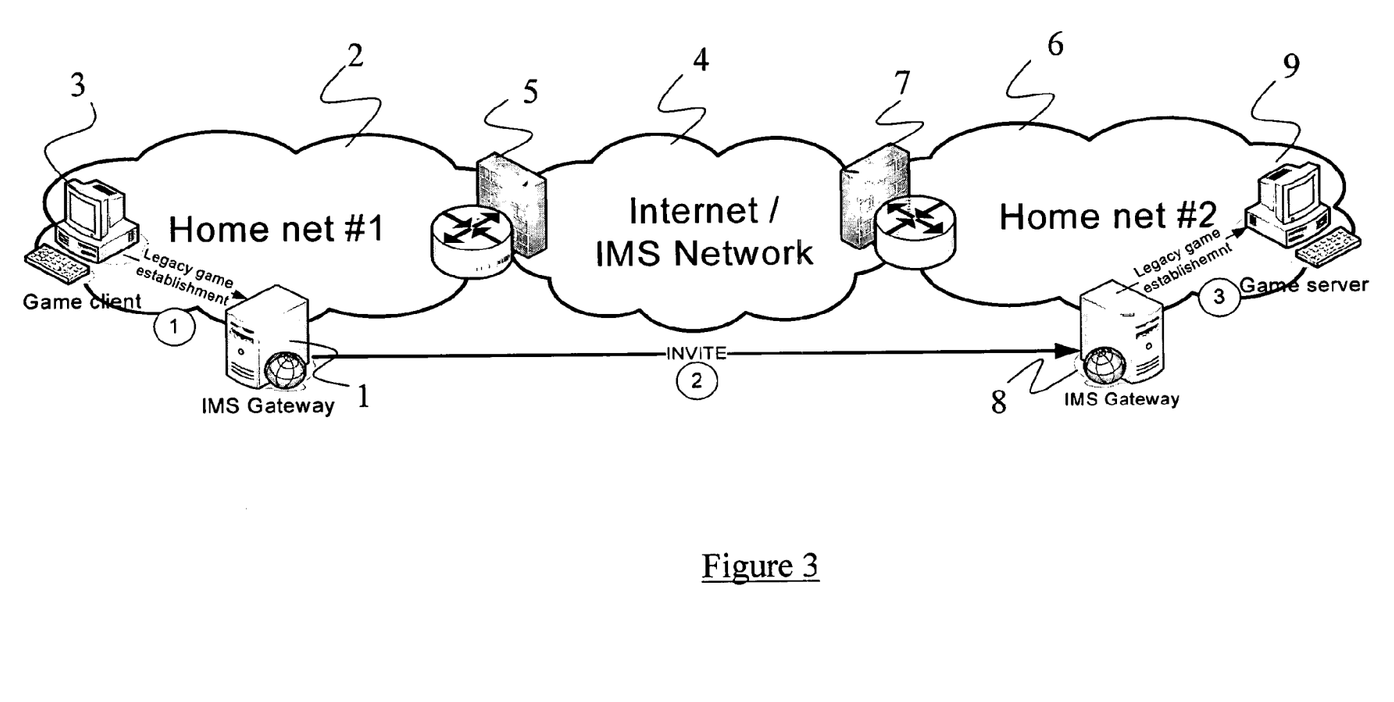

Once the game client 3 has received a response from the IMS gateway 1 containing an IP address and port number for an appropriate application, the client may send a legacy protocol message to that address requesting a connection to the application. The request is received by the local IMS Gateway and is mapped to the corresponding GRUU. The IMS Gateway then generates a SIP INVITE addressed to the GRUU, and sends this towards the IMS as illustrated in FIG. 3. The message is routed across the IMS and is received by the second IMS Gateway, which maps the GRUU to the local address of the game server and contacts the server using the legacy protocol. In the same way, the 200 OK response is routed from the second to the first IMS Gateway via the IMS network. When a session is established, the IMS Gateways relay legacy protocol messages between the local networks, thus ensuring that the messages are delivered reliably. It is noted that user plane traffic is also routed via the IMS Gateways and the IMS network ensuring a guaranteed QoS for the session.

Figure 4:
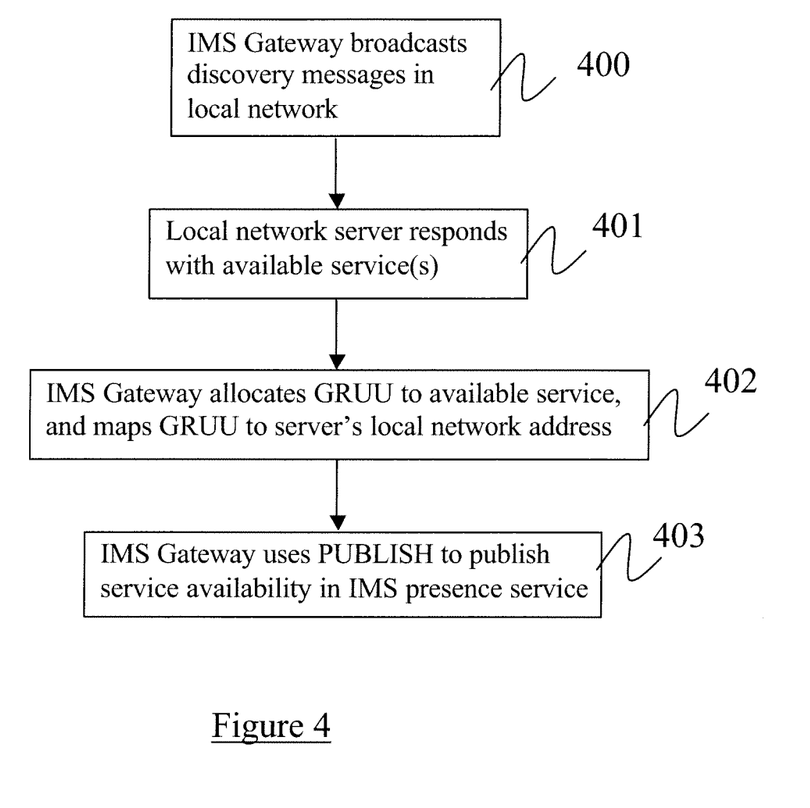
FIG. 4 is a flow diagram showing a process for publishing services on an IMS presence service.

FIG. 4 is a flow diagram further illustrating a process for publishing services available on a legacy server via the IMS presence service. The process comprises initial service discovery steps, steps 400 and 401, followed by a step of allocating a GRUU at the IMS Gateway, step 402, and a step of publishing the GRUU on the IMS presence service, step 403.

Figure 5:
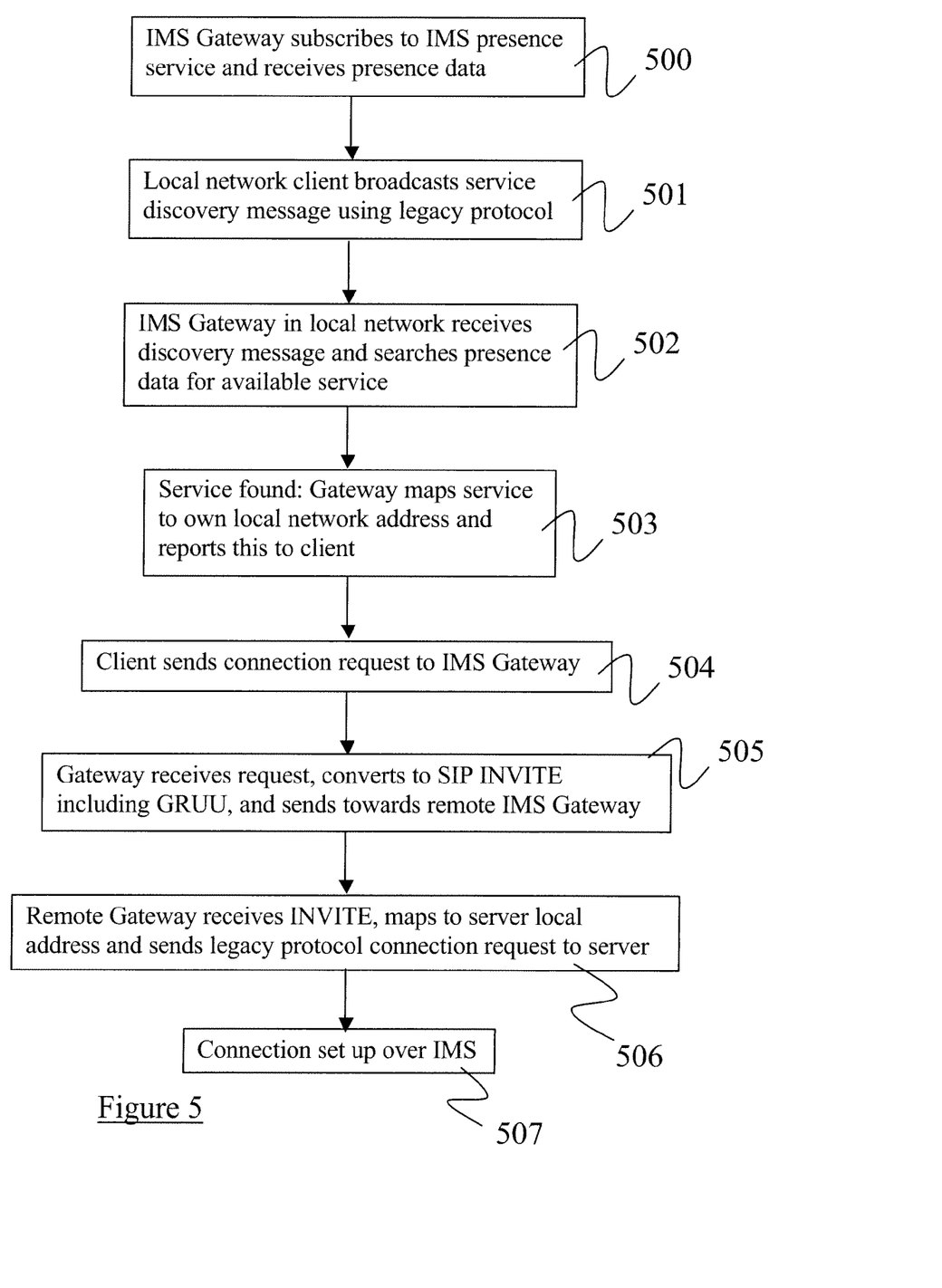
FIG. 5 is a flow diagram showing a process for locating and connecting to services advertised using the process of FIG. 4.

FIG. 5 is a flow diagram illustrating a process for identifying a service to a legacy terminal, and for establishing a connection to such a service. It includes the steps of the IMS Gateway subscribing to the IMS presence service, step 500, performing the discovery process in the local network, steps 501 and 502, and mapping the service to a local network address, step 503. Thereafter, the steps of a client initiating a connection, step 504, and sending and receiving the INVITE, steps 505 and 506, are performed prior to the step of setting up the connection over the IMS, step 507.

Figure 6:
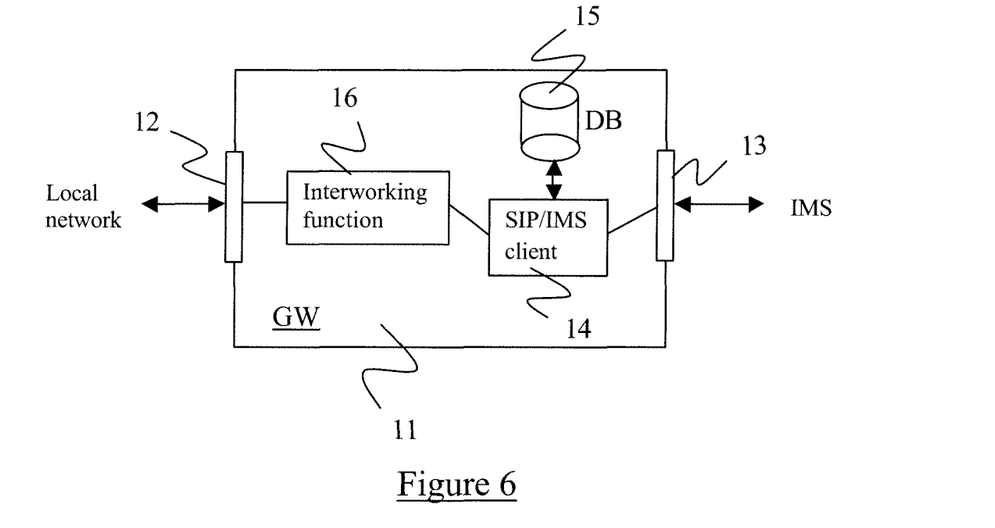
FIG. 6 illustrates schematically an IMS Gateway for use in the system of FIGS. 1 to 3.

FIG. 6 illustrates schematically an IMS Gateway 11 arranged to provide the services described above. The gateway comprises a first interface 12 for connection to the local network and a second interface 13 for connection to the IP network (IMS). It also comprises an IMS/SIP client 14 and a database 15 for storing presence information, and an interworking function 16 which provides interworking between the IMS and local network domains.

It will be appreciated by the person of skill in the art that various modifications may be made to the above described embodiment without departing from the scope of the present invention. In particular, whilst the embodiment described is concerned with a most complex scenario, i.e. where both the client and the server are both located behind an IMS Gateway, the invention is also applicable to the case where only one of the client and server are located behind an IMS Gateway. Consider for example the case where only the server is behind such a Gateway, and the client is an IMS/SIP client. In this case, the client can subscribe directly to the IMS presence service, whilst the services offered by the server are published on its behalf by the IMS Gateway. Conversely, if the server contains an IMS/SIP client, it may publish its presence information directly.

It will also be appreciated that a client and server may subscribe to different IMS networks, i.e. owned by different operators. In this case, presence servers within one network can subscribe to information published on the presence servers of the other network, and SIP messages are seamlessly routed between the networks.

The invention claimed is:

1. A method in an Internet Protocol (IP) Multimedia Subsystem Gateway for enabling a legacy host, attached to a local network, to discover a service provided by a remote server, comprising the steps of:
    subscribing to an IP Multimedia Subsystem presence service; receiving presence information published by said IP Multimedia Subsystem presence service, said presence information including at least one Globally Routable User agent Uniform Resource Identifier (URI) and a service description associated therewith; receiving a service discovery message sent by said legacy host, wherein said service discovery message is broadcast in said local network according to a service discovery protocol; searching said presence information including said service description to identify a requested service and an associated Globally Routable User agent URI; and sending a response to said legacy host including a local network address of said Gateway, whilst maintaining a mapping between said local network address expressed in a legacy protocol and said Globally Routable User agent URI expressed in an IP Multimedia Subsystem protocol.

2. The method according to claim 1, wherein a user of said legacy host is a subscriber of an IP Multimedia Subsystem providing said IP Multimedia Subsystem presence service, said Gateway performing an IP Multimedia Subsystem registration on behalf of said user.

3. The method according to claim 1, wherein said local network address is an IP address and port number of said Gateway.

4. The method according to claim 1, wherein said step of searching said presence information identifies a plurality of services matching said requested service, the method further comprising sending a plurality of responses identifying respective local network addresses, and maintaining at said Gateway a mapping between said local network addresses expressed in said legacy protocol and respective Globally Routable User agent URIs expressed in said IP Multimedia Subsystem protocol.

5. The method according to claim 1, further comprising:
    receiving a connection request at said local network address of said Gateway;
    mapping said local network address expressed in said legacy protocol to said Globally Routable User agent URI expressed in said IP Multimedia Subsystem protocol;
    sending a Session Initiation Protocol (SIP) INVITE to said Globally Routable User agent URI; and
    establishing an IP Multimedia Subsystem session.

6. A method in an Internet Protocol (IP) Multimedia Subsystem Gateway for enabling a legacy server, attached to a local network, to advertise services to remote clients, comprising the steps of: subscribing to an IP Multimedia Subsystem presence service; broadcasting, over said local network, a service discovery message, wherein said service discovery message is broadcast in said local network according to a service discovery protocol; receiving a service response from said legacy server, said service response including a local network address for each service offered; assigning a Globally Routable User agent Uniform Resource Identifier (URI) to each service; maintaining a mapping between each Globally Routable User agent URI expressed in an IP Multimedia Subsystem protocol and a corresponding local network address expressed in a legacy protocol; and publishing each Globally Routable User agent URI and a service description associated therewith on said IP Multimedia Subsystem presence service.

7. The method according to claim 6, wherein an operator of said legacy server is a subscriber of an IP Multimedia Subsystem providing said IP Multimedia Subsystem presence service, said Gateway performing an IP Multimedia Subsystem registration on behalf of said operator.

8. The method according to claim 6, wherein each local network address is an IP address and port number of said Gateway.

9. The method according to claim 6, further comprising the steps of:
    receiving a Session Initiation Protocol (SIP) INVITE at said Gateway and addressed to one of said Globally Routable User agent URIs;
    mapping said Globally Routable User agent URI expressed in said IP Multimedia Subsystem protocol to a local network address expressed in a legacy protocol of said legacy server; and
    sending a connection establishment request to said legacy server.

10. An apparatus configured to operate as an Internet Protocol (IP) Multimedia Subsystem Gateway within a local network for a purpose of enabling a legacy host, attached to said local network, to discover a service provided by a remote server, the apparatus comprising: an interface operable for connection with said local network; and an IP Multimedia Subsystem client and an interworking function collectively being configured to: subscribe to an IP Multimedia Subsystem presence service; receive presence information published by said IP Multimedia Subsystem presence service, said presence information including at least one Globally Routable User agent Uniform Resource Indicator (URI) and a service description associated therewith; receive a service discovery message sent by said legacy host, wherein said service discovery message is broadcast in said local network according to a service discovery protocol; search said presence information including said service description to identify a requested service and an associated Globally Routable User agent URI; and send a response to said legacy host, said response including a local network address of said Gateway, whilst maintaining a mapping between said local network address expressed in a legacy protocol and said Globally Routable User agent URI expressed in an IP Multimedia Subsystem protocol.

11. The apparatus according to claim 10, wherein said local network address is an IP address and port number of said apparatus.

12. An apparatus configured to operate as an Internet Protocol (IP) Multimedia Subsystem Gateway within a local network for a purpose of advertising services available on one or more servers attached to said local network, the apparatus comprising: an interface operable for connection with said local network; and an IP Multimedia Subsystem client and an interworking function collectively being configured to: subscribe to an IP Multimedia Subsystem presence service; broadcast, over said local network, a service discovery message, wherein said IP Multimedia Subsystem client and said interworking function, collectively, are further configured to broadcast said service discovery message over said local network according to a service discovery protocol; receive a service response from said legacy server, said service response including a local network address for each service offered; assign a Globally Routable User agent Uniform Resource Indicator (URI) to each service; maintain a mapping between each Globally Routable User agent URI expressed in an IP Multimedia Subsystem protocol and a corresponding local network address expressed in a legacy protocol; and publish each Globally Routable User agent URI and a service description associated therewith on said IP Multimedia Subsystem presence service.

13. The apparatus according to claim 12, further comprising a database for storing presence information, and wherein said interworking function provides interworking between IP Multimedia Subsystem and local network domains.

14. The apparatus according to claim 10, further comprising a database for storing said presence information, and wherein said interworking function provides interworking between IP Multimedia Subsystem and local network domains.

15. The apparatus according to claim 10, wherein said interface is a first interface, and wherein said apparatus further comprises a second interface operable for connection with an IP network comprising an IP Multimedia Subsystem.

* * * * *